March 19, 1935.  C. H. WILD  1,995,085
MACHINE FOR ASSEMBLING AND FILLING PACKAGES INTO A CARTON OR THE LIKE
Filed June 23, 1931   13 Sheets-Sheet 1

Inventor
Charles N. Wild
By J. T. Dowling
Attorney

March 19, 1935.     C. H. WILD     1,995,085
MACHINE FOR ASSEMBLING AND FILLING PACKAGES INTO A CARTON OR THE LIKE
Filed June 23, 1931     13 Sheets-Sheet 3

Inventor
Charles H. Wild
By J. T. Dowling
Attorney

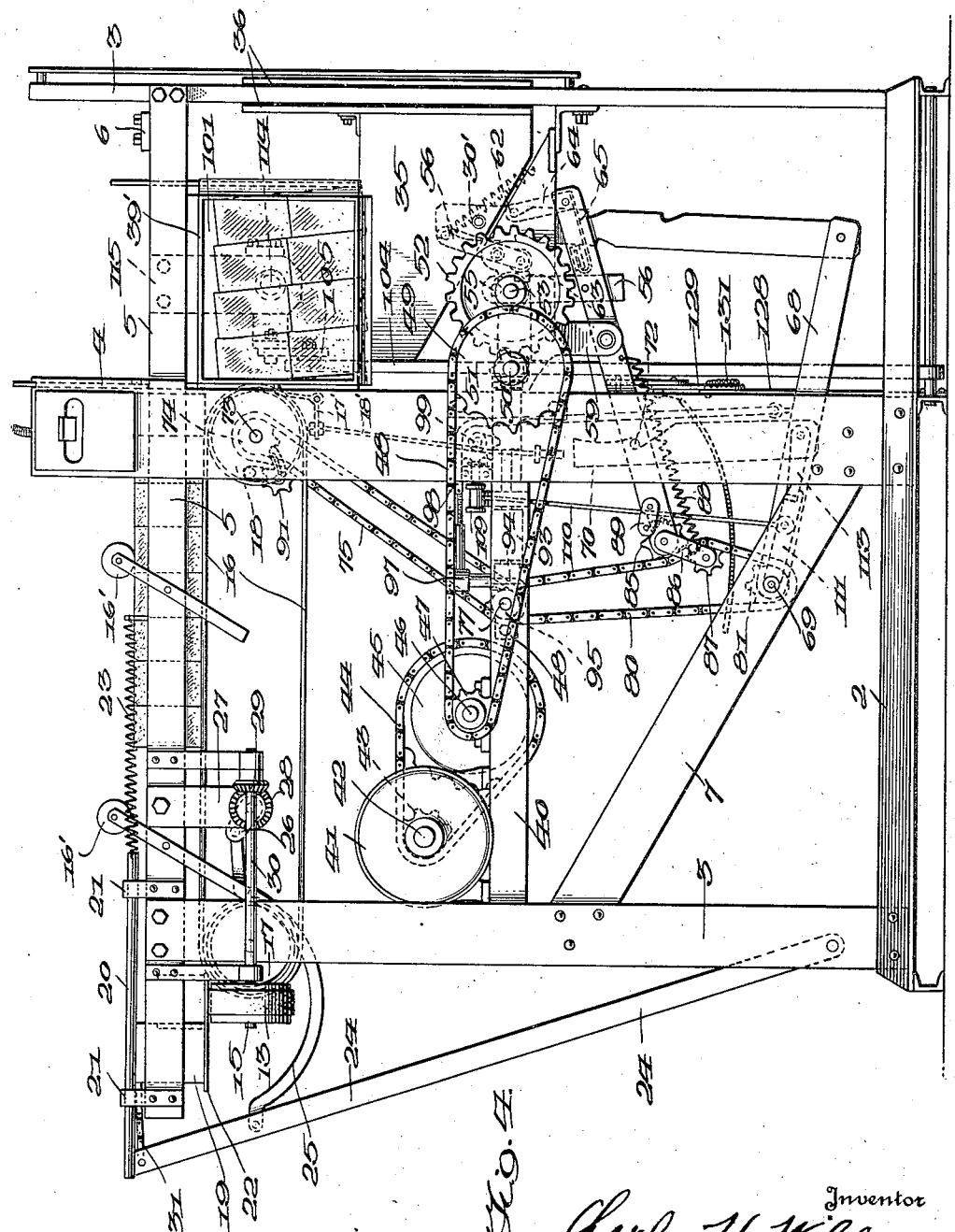

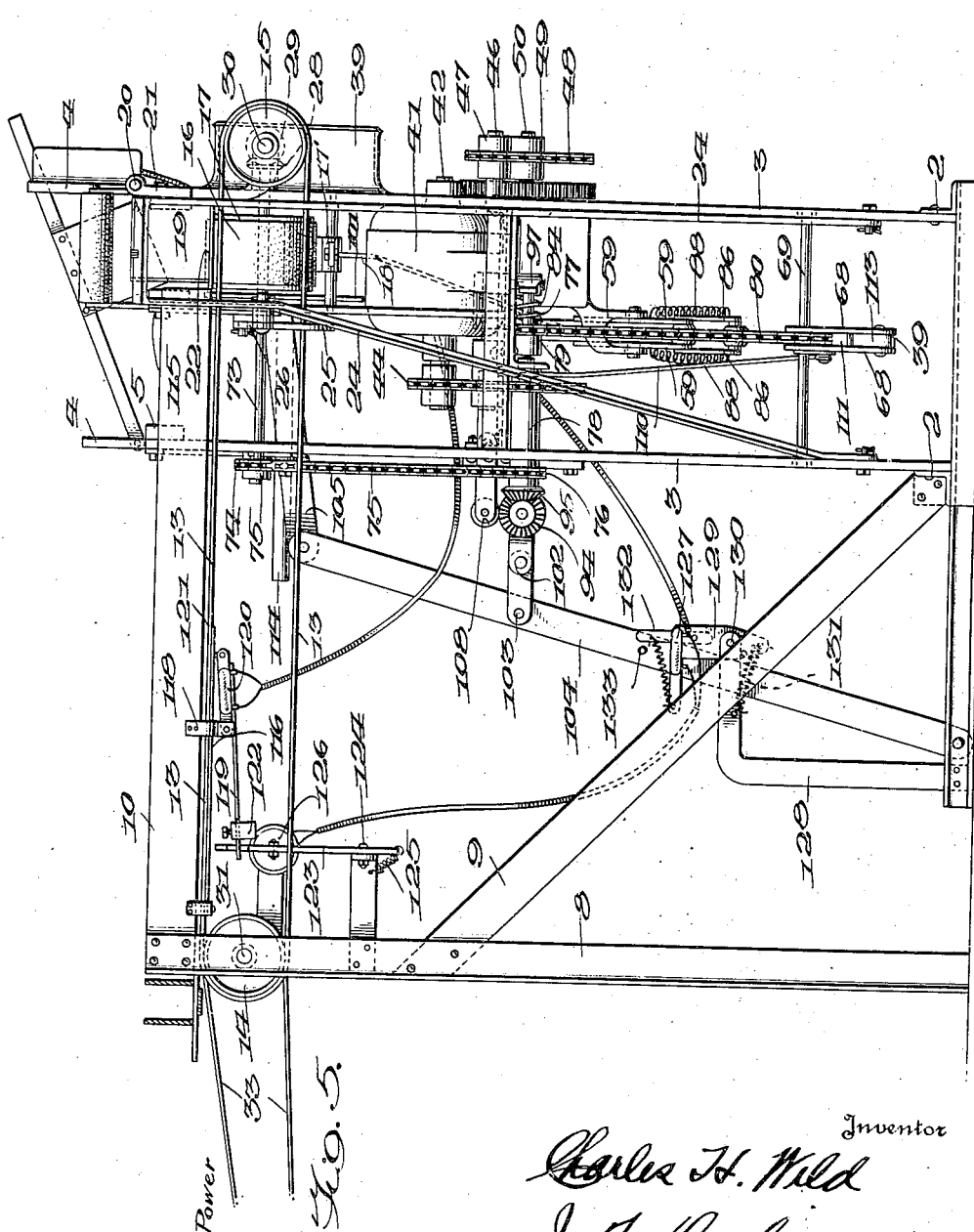

March 19, 1935. C. H. WILD 1,995,085
MACHINE FOR ASSEMBLING AND FILLING PACKAGES INTO A CARTON OR THE LIKE
Filed June 23, 1931 13 Sheets-Sheet 6
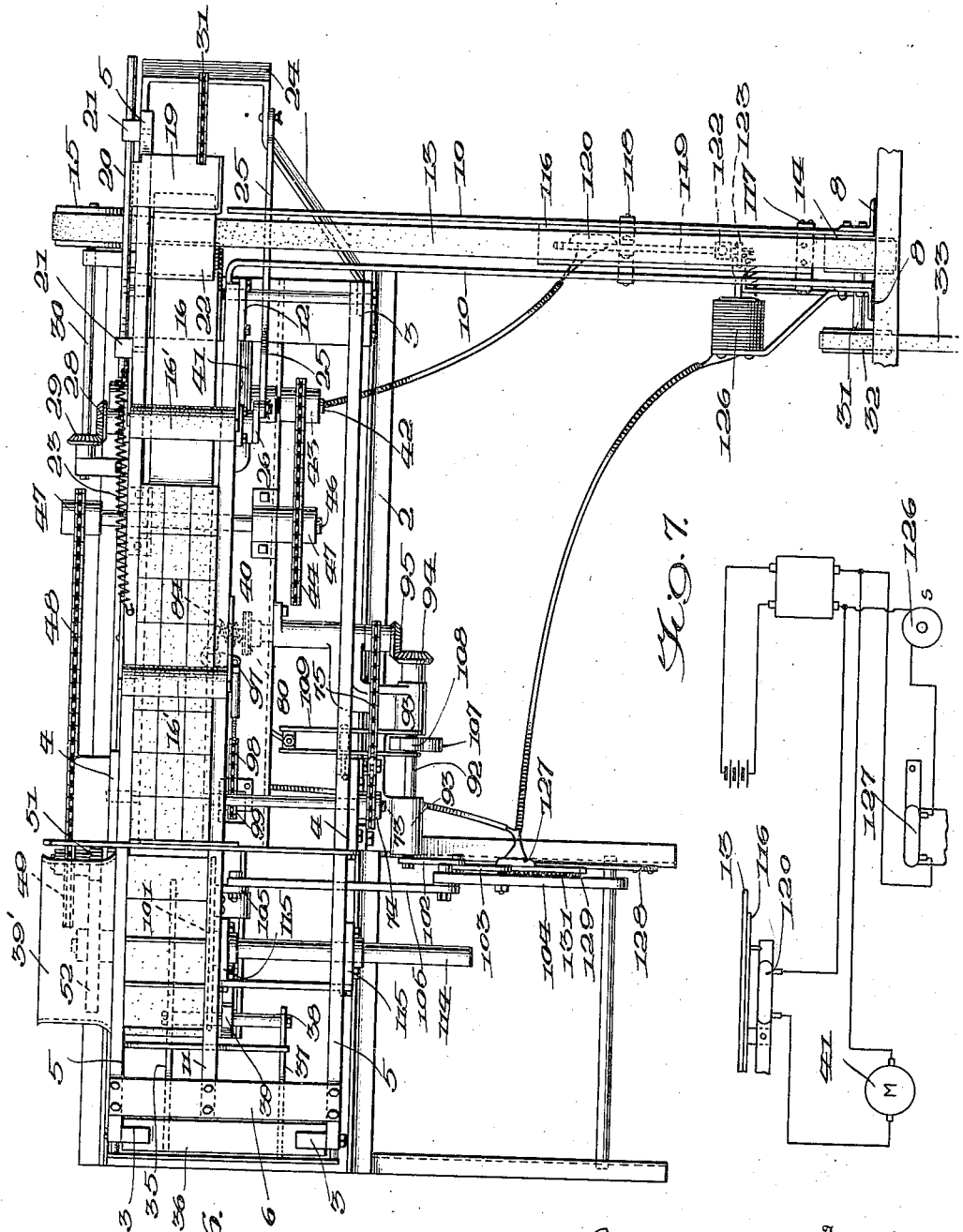

March 19, 1935. C. H. WILD 1,995,085
MACHINE FOR ASSEMBLING AND FILLING PACKAGES INTO A CARTON OR THE LIKE
Filed June 23, 1931 13 Sheets-Sheet 7
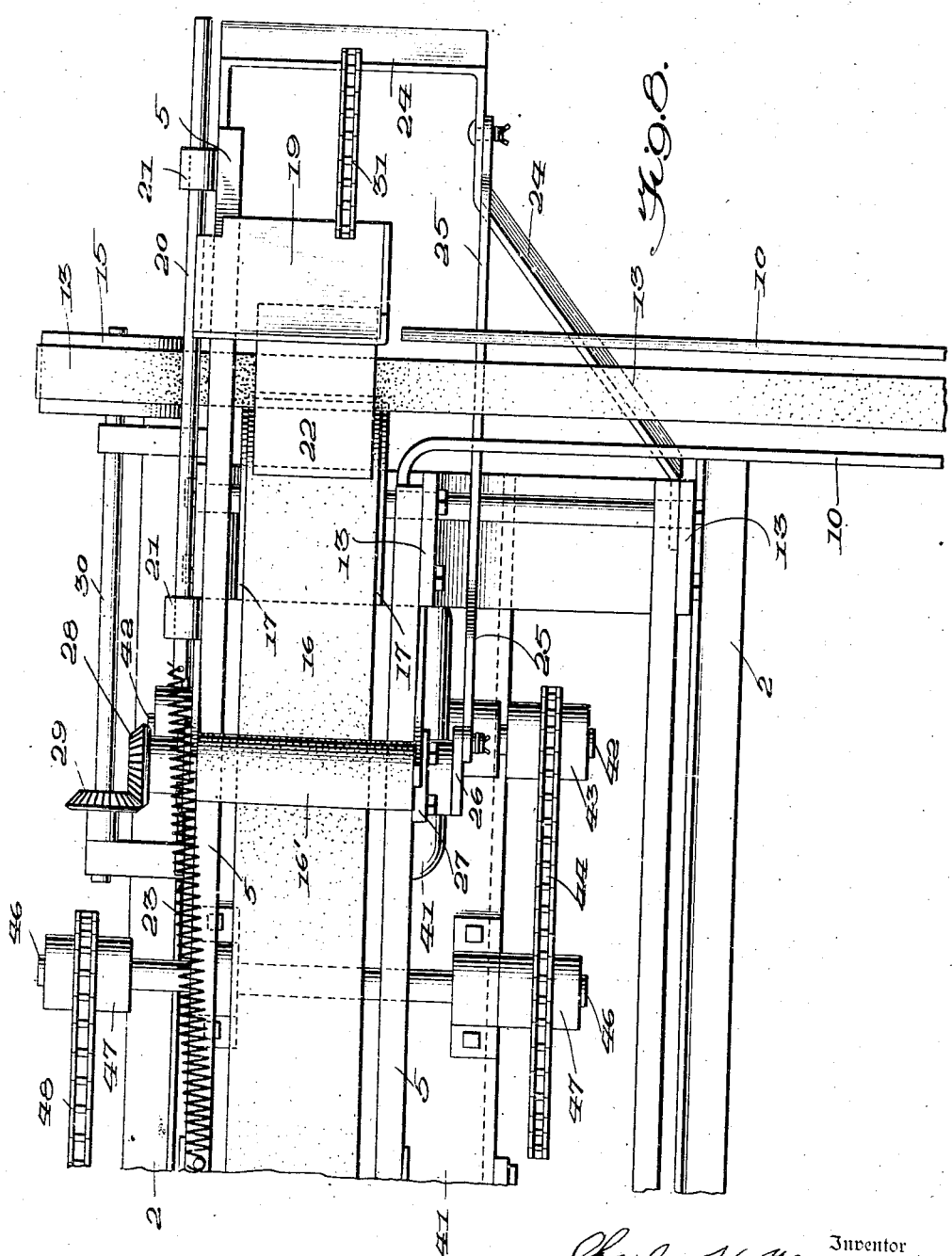

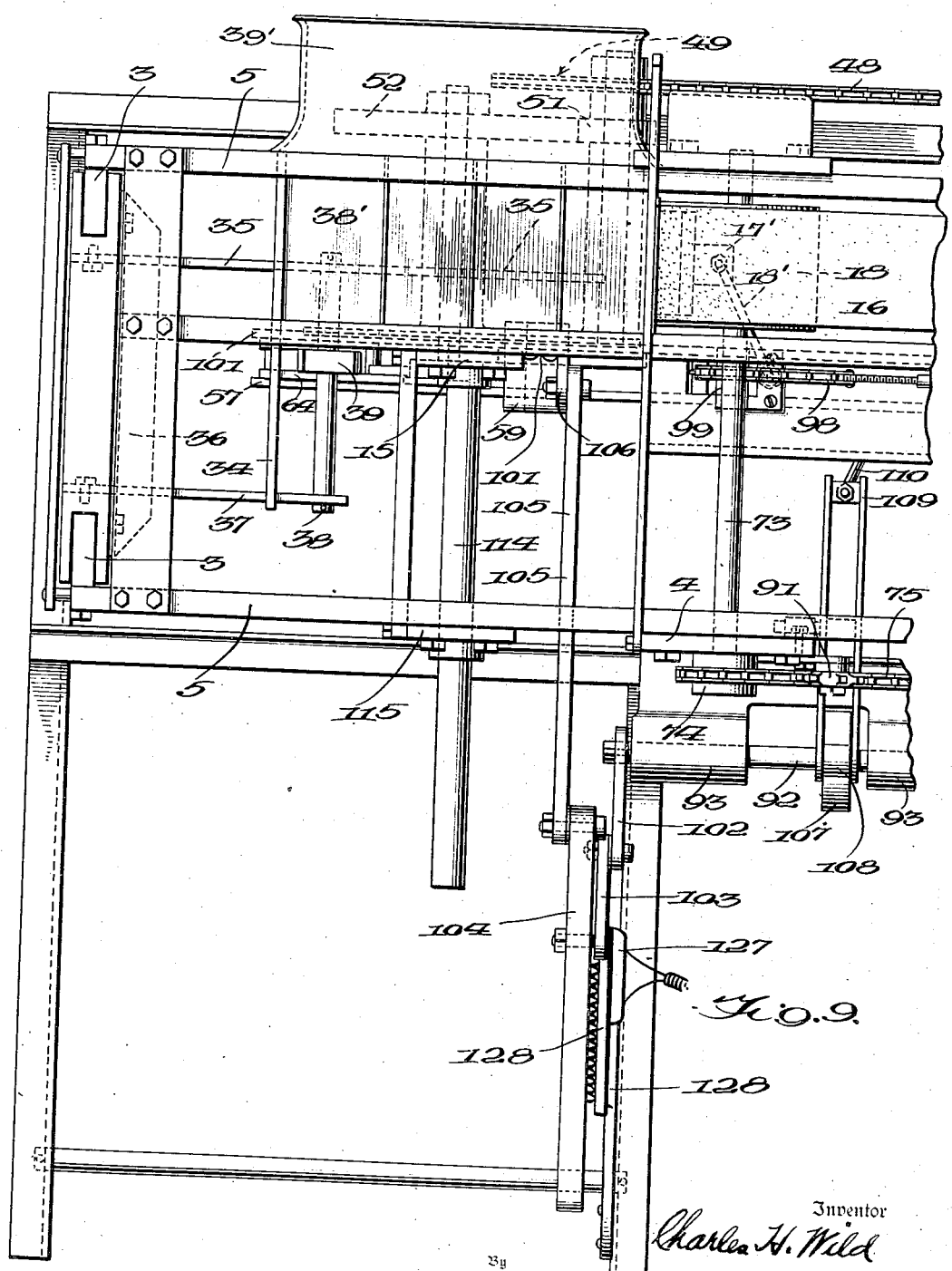

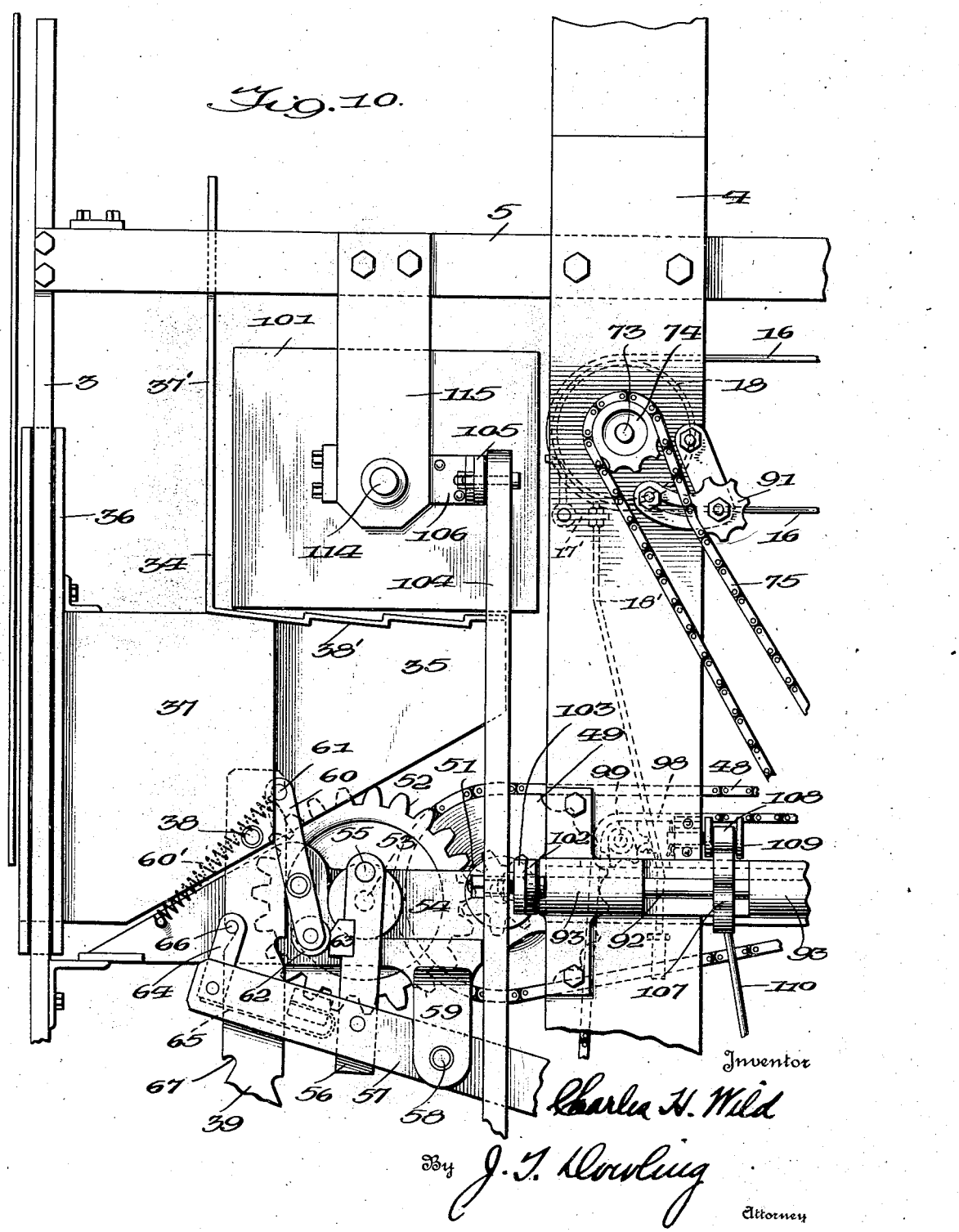

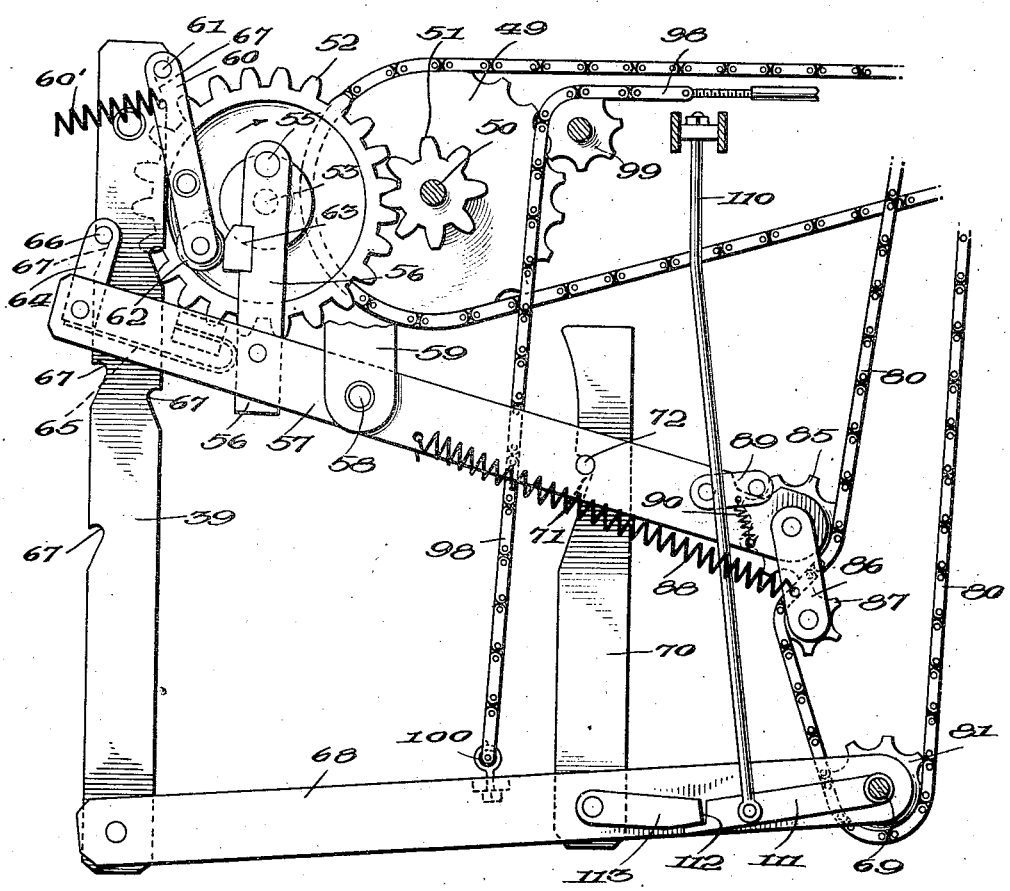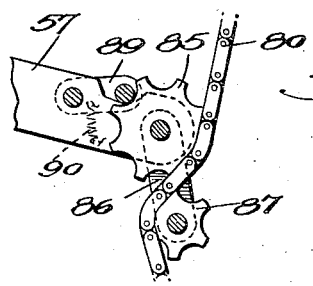

March 19, 1935.　　　　C. H. WILD　　　　1,995,085
MACHINE FOR ASSEMBLING AND FILLING PACKAGES INTO A CARTON OR THE LIKE
Filed June 23, 1931　　　13 Sheets-Sheet 11
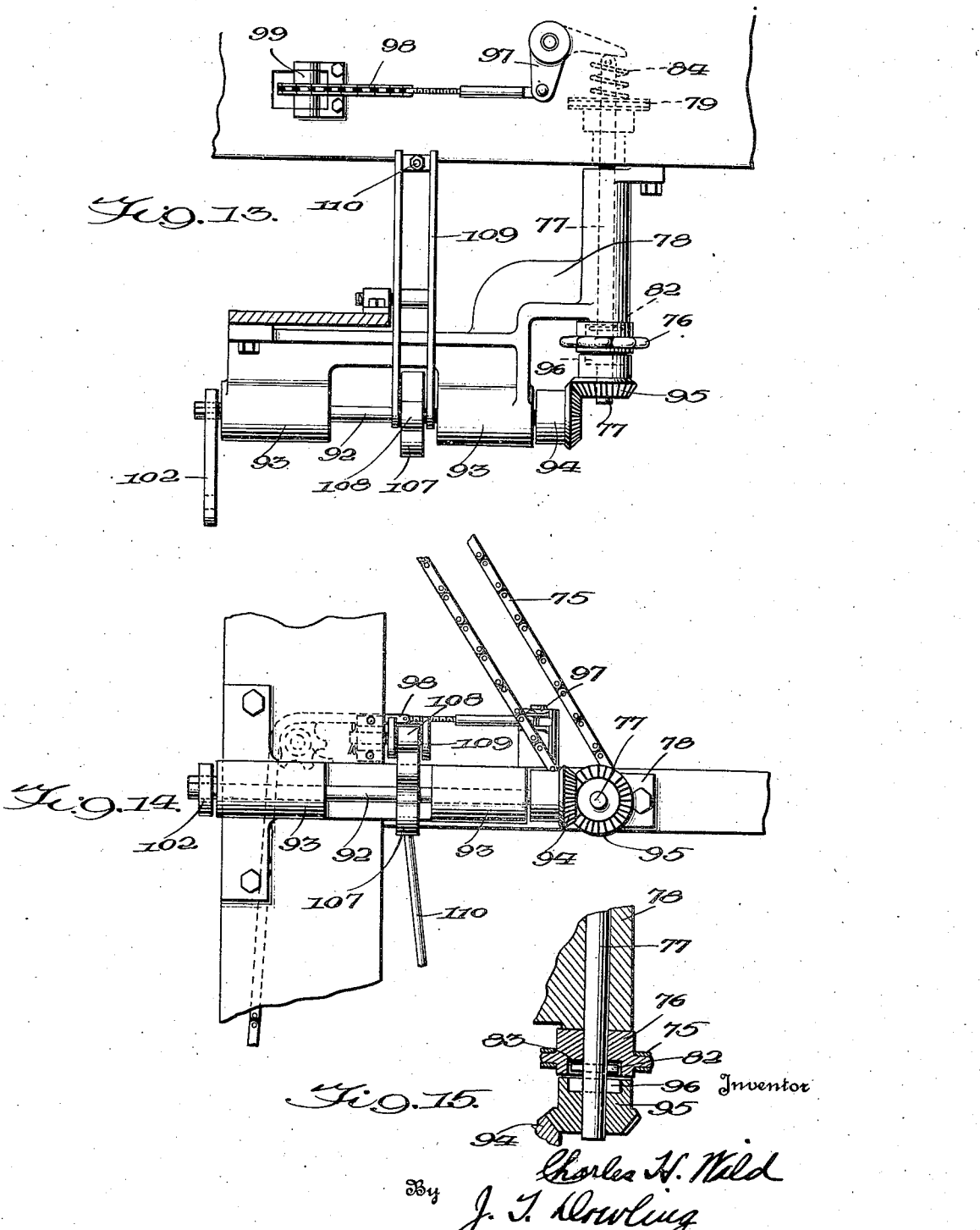

March 19, 1935.  C. H. WILD  1,995,085
MACHINE FOR ASSEMBLING AND FILLING PACKAGES INTO A CARTON OR THE LIKE
Filed June 23, 1931   13 Sheets-Sheet 12
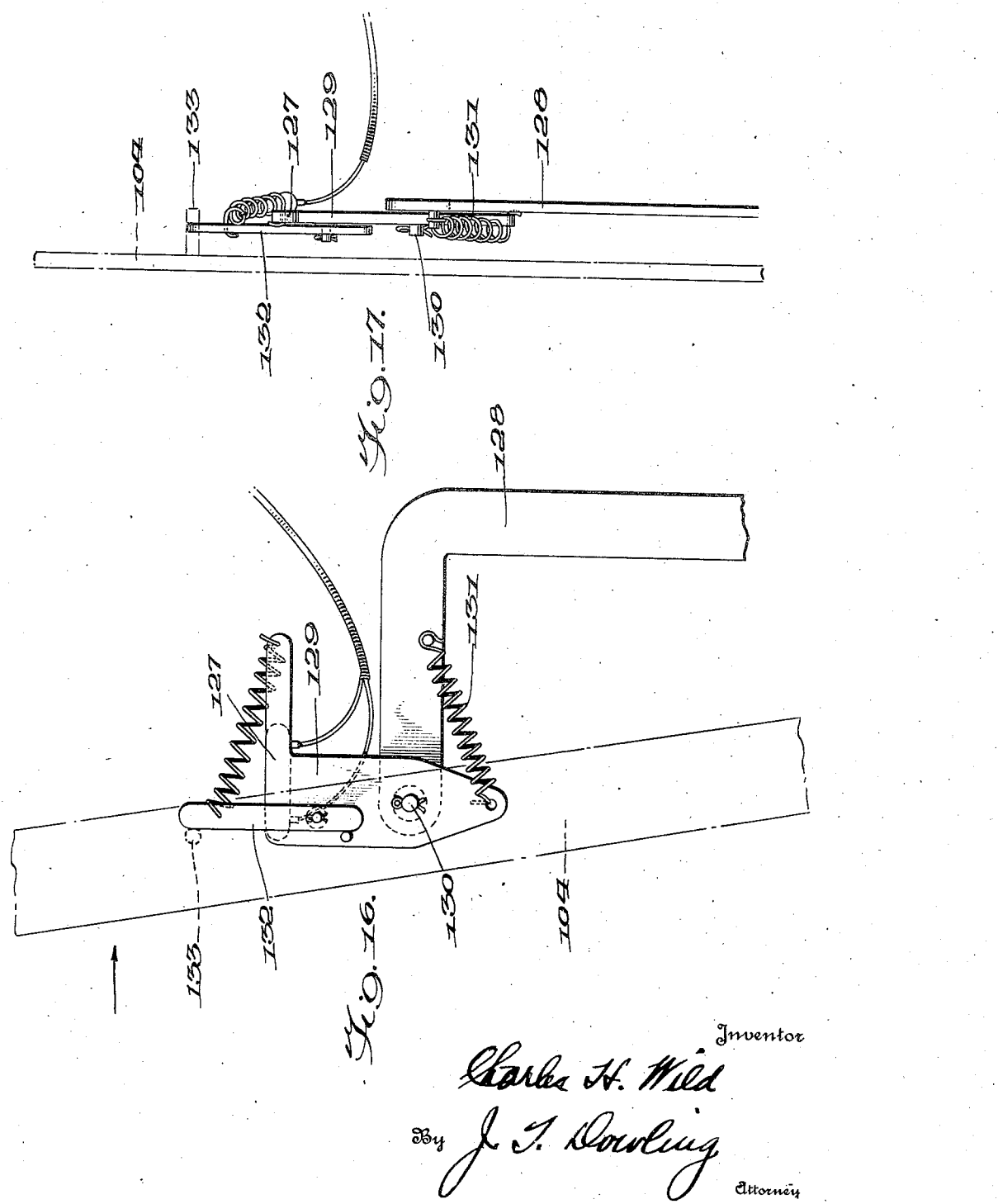

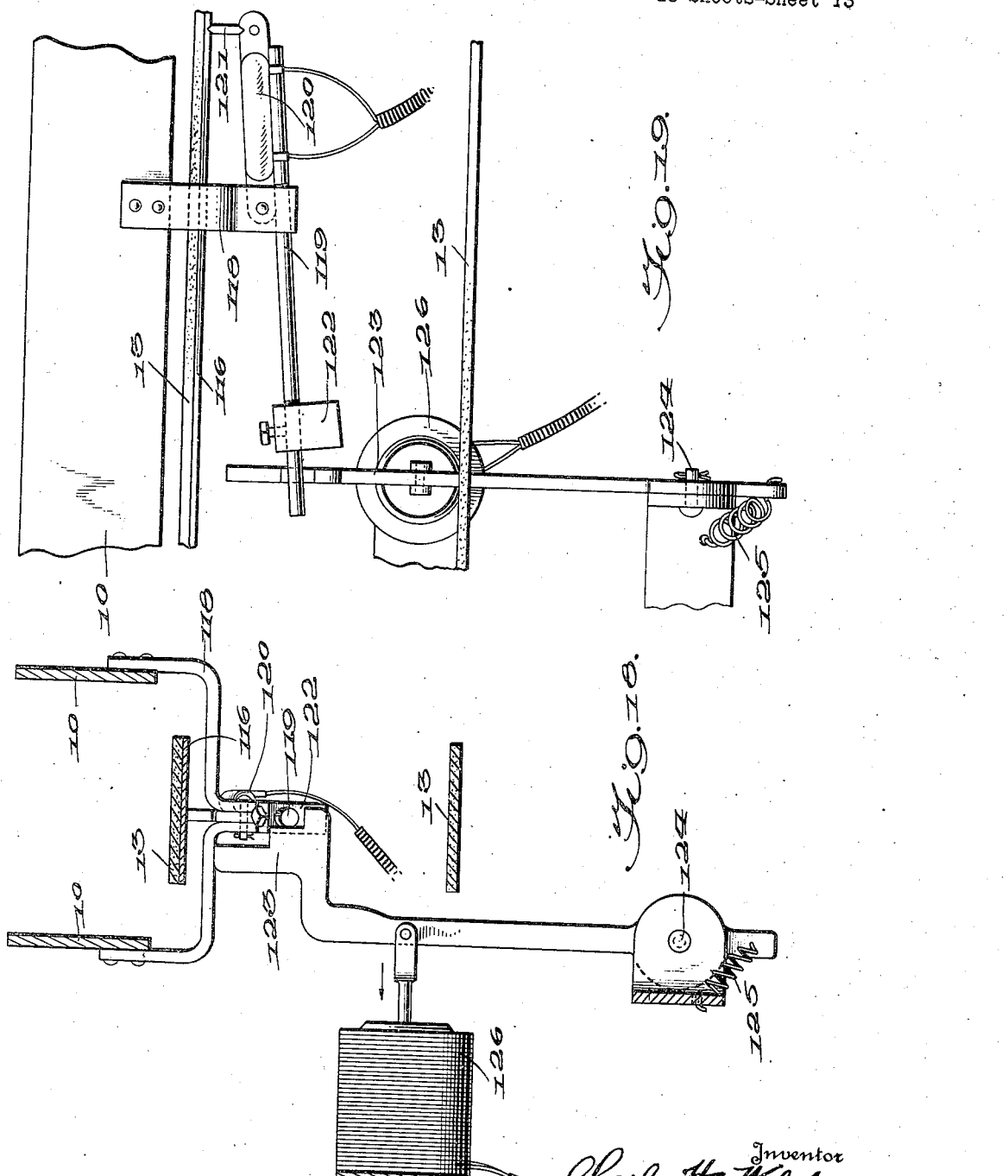

Patented Mar. 19, 1935

1,995,085

UNITED STATES PATENT OFFICE 1,995,085

MACHINE FOR ASSEMBLING AND FILLING PACKAGES INTO A CARTON OR THE LIKE

Charles H. Wild, Baltimore, Md., assignor to Burt Machine Company, Baltimore, Md.

Application June 23, 1931, Serial No. 546,376

15 Claims. (Cl. 226—14)

This invention relates to certain improvements in an automatic machine for grouping, assembling and inserting into a shipping crate or carton, a predetermined number of packages, in a rapid and continuous manner and the crate or carton thereafter delivered from the machine completely filled and ready to be closed and sealed.

More specifically the improved machine comprises a succession of co-related and co-ordinated instrumentalities including a pair of horizontal and transversely arranged belts, one belt continuously operated for receiving the packages preferably in single file and delivering the same by means of a horizontally reciprocating pusher plate or deflector, in blocks or groups of preferably three packages to a group, onto the second belt, which latter belt feeds or discharges in an intermittent and successive manner, the packages in preferably two layers, of twelve packages to a layer, onto a vertically reciprocating platform or magazine sufficient to fill a carton of the desired capacity supported adjacent the magazine, a horizontally reciprocating pusher plate or ejector being associated with the magazine and employed to force or move all of the packages simultaneously from the filled magazine, in a direction transversely of the direction of travel of the packages being delivered into said magazine, into the positioned carton or crate supported adjacent the mechanism to receive said assembled or grouped packages.

All of these various mechanisms, with the exception of the first feed belt, are primarily driven by an electric motor carried by the frame of the machine and the necessary driving connections and devices are assembled and arranged in a novel manner to accurately and properly time the various mechanical movements associated with the respective operating parts for assembling, transferring, delivering and discharging the groups of packages, so that the entire mechanism will properly function and be put into operation by merely starting the motor, said motor being automatically started and stopped by a novel arrangement of switch devices controlled by said movements of the machine itself and the packages passing through said machine, all of which will be clearly described in the detail description to follow.

The object of the invention is the production of a machine for continuously and uninterruptedly filling into a shipping crate or carton a predetermined number of packages as long as any packages are fed to the machine.

Another object of the invention is to provide a means whereby the motor for driving the same is automatically started when a predetermined number of packages are in position on the first feed belt, said means also functioning to stop the machine automatically when the supply of packages to the first feed belt is exhausted.

Another object of the invention is to provide a further safety means associated with the discharge end of the machine whereby the motor will be in a position to be stopped after each operation of the discharge mechanism, this means being so associated with the first mentioned automatic stopping and starting means whereby said second stopping means will only be effective when the first mentioned starting and stopping means is in its stopping position.

Another object of the machine is to provide a novel means associated with the receiving magazine at the delivery end of the machine for so positioning the first layer of packages in said magazine in such a manner as to insure the unobstructed delivery of the second layer of packages into said magazine above the first layer. Specifically this means has reference to the stepped construction of the bottom of the magazine, to be hereinafter more fully described.

A further object of the invention is to provide a novel mechanism for intermittently raising and lowering the magazine in order to receive the packages in the magazine in superimposed layers.

Another object of the invention is to provide a novel means associated with the magazine for removing the assembled packages from the magazine in timed relation with respect to the position of the magazine and upon the final filling of said magazine.

Another object of the invention is to provide certain novel instrumentalities so timed with respect to the vertical movements of the magazine as to cause a feeding of the packages from the second feed belt only at such times as the magazine is in proper position to receive said packages.

Another object of the invention is to provide a novel mechanism associated with the horizontally reciprocating pusher or ejector, so timed with respect to the reciprocation of the magazine and the feeding of the packages to the magazine, as to prevent or withhold the feeding of the packages to the magazine during the operation of the pusher plate in discharging the packages from the magazine into the carton associated with said magazine.

Another object of the invention is to provide a means associated with the mechanism for reciprocating the magazine for forcing or pushing the packages well back into the magazine after each successive layer is delivered to the magazine and prior to the discharge of said packages from the magazine into the carton so that there will be no danger of the packages projecting from the inner side edge of the magazine in such a manner as to prevent their proper discharge therefrom.

Other objects of the invention will be apparent from the following detailed description.

The preferred embodiment of the invention is illustrated in the accompanying drawings, in which Figure 1 is a rear elevational view in perspective of the complete machine;

Fig. 4 is a front elevational view also showing the magazine in its lowermost position;

Fig. 5 is a side or end view in elevation;

Fig. 6 is a plan view;

Fig. 7 is a view diagrammatically illustrating the electric circuit including the switch devices for controlling the operation of the machine;

Fig. 8 is an enlarged detail plan view of that end of the machine showing the relation between the two cooperating feed belts;

Fig. 9 is an enlarged detail plan view showing the delivery end of the machine and the receiving magazine;

Fig. 10 is an enlarged detail view in elevation of the delivery end of the machine more clearly illustrating the construction of the receiving magazine;

Figs. 11, 12, 13, 14 and 15 are detail views showing various parts of the operating mechanism, to be hereinafter more fully described in detail; and Figs. 16, 17, 18 and 19 are enlarged detail views of that part of the mechanism associated with the electrical switch devices for controlling the operation of the machine.

Figure 1:
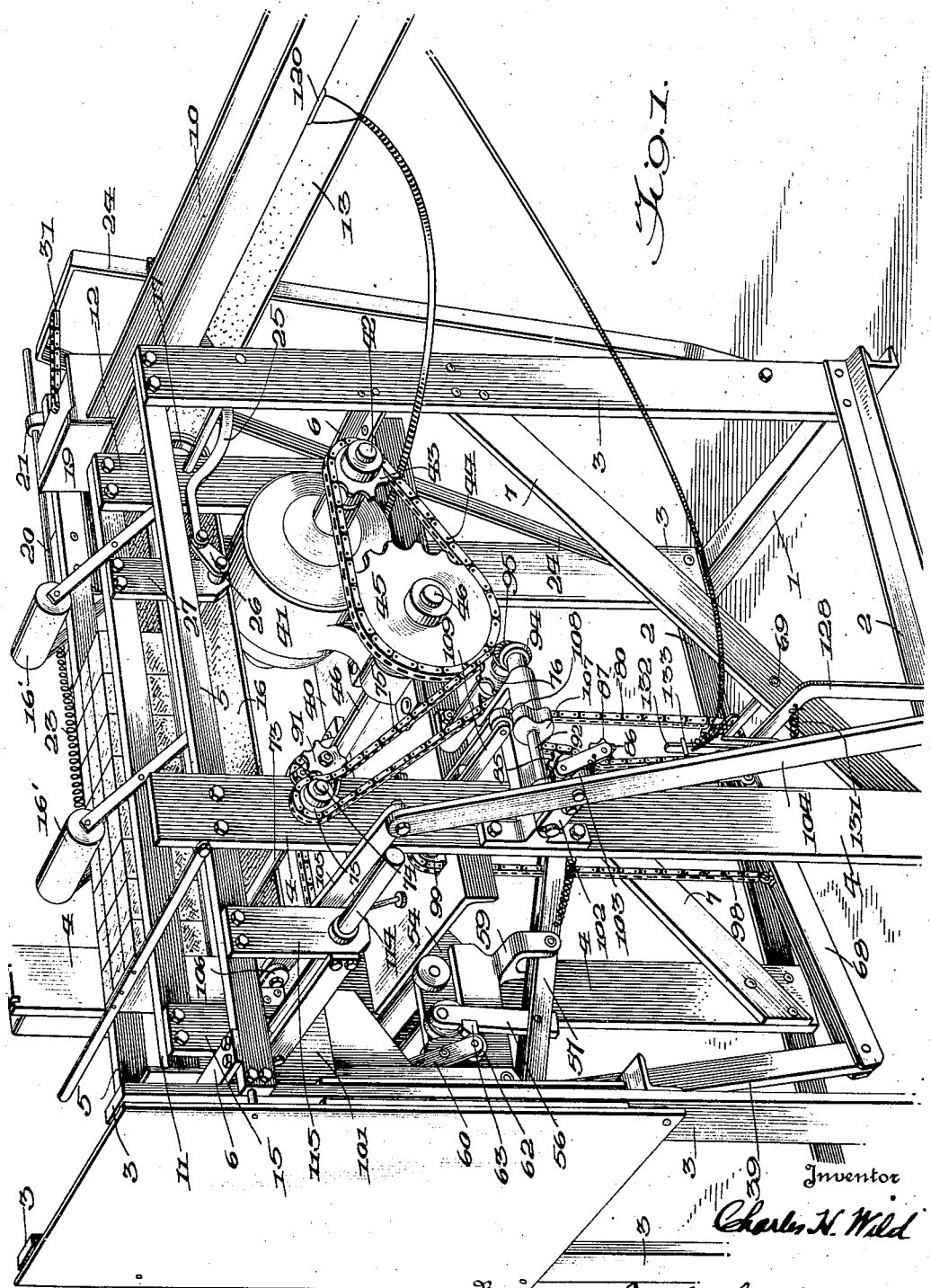

Referring to the drawings in detail, with particular reference to Figs. 1 to 6 inclusive, the machine comprises a main frame consisting of end bed members 1 connected by longitudinal members 2. Projecting upwardly from the bed frame comprising the members 1 and 2 are vertical end members 3 and intermediate vertical members 4, the upper ends of these members being connected by longitudinal members 5 and transverse end members 6. This frame just described is braced by diagonally disposed straps or the like 7.

Extending at right angles to this main frame is a supplemental frame consisting of a pair of uprights 8 and a diagonal brace or the like 9 (see Figs. 5 and 6), said uprights 8 having secured to their upper ends horizontally disposed parallel metallic members 10, which members form a guide for the packages as they are first fed into the machine in the manner to be hereinafter described.

Arranged longitudinally of the main frame and at the upper portion thereof, there is an intermediate rail or member 11 (see Figs. 1 and 6), one end of said intermediate member 11 being secured to the transverse end member 6, and the other end to the intermediate vertically disposed support 12. This intermediate longitudinal member 11 together with the longitudinal member 5 of the main frame form a means of retaining and guiding the packages as they are fed by the second feed belt, in a manner to be hereinafter more fully described.

Figure 2:
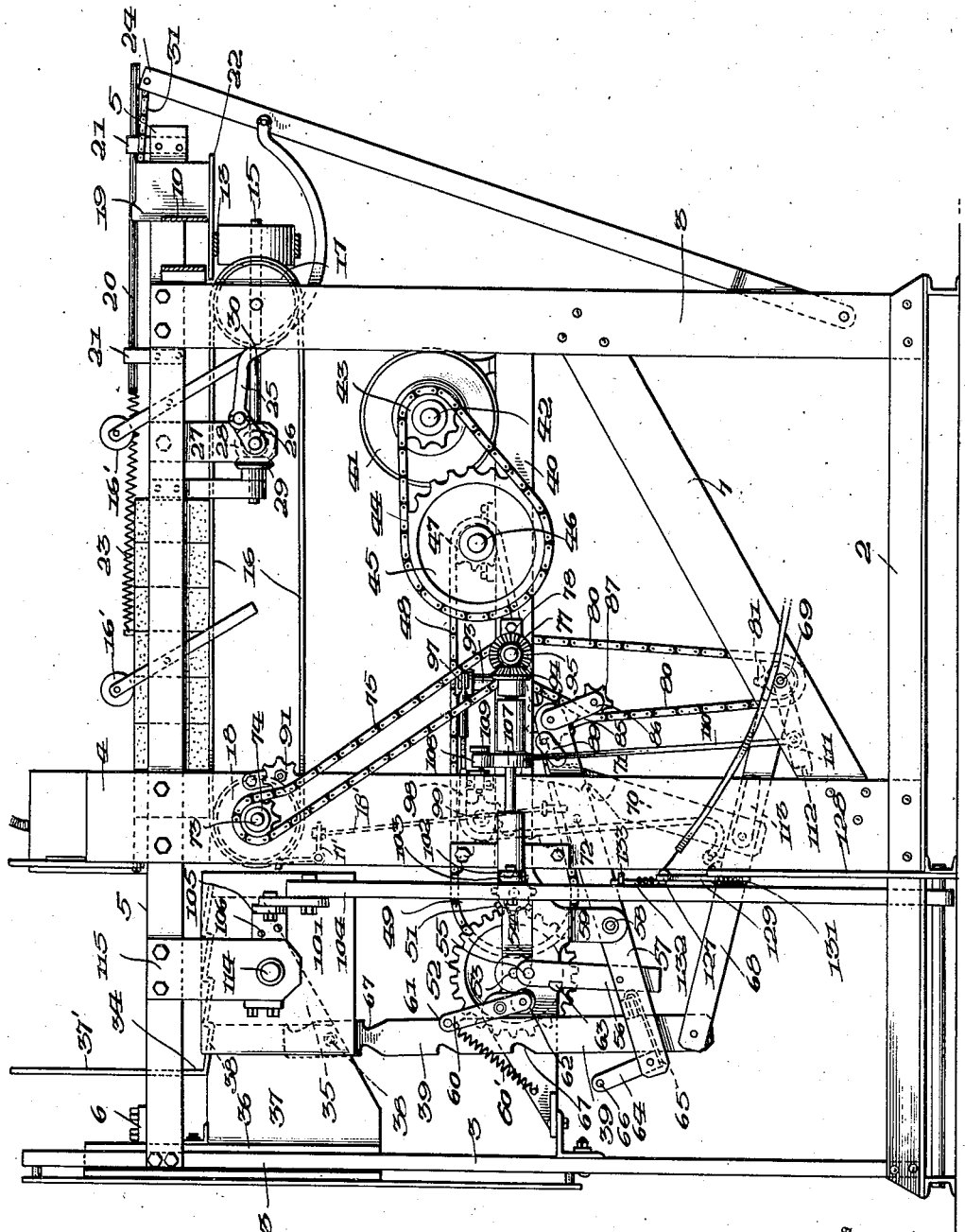
Fig. 2 is a rear elevational view showing the magazine in position to receive the first layer of packages.
Figure 3:
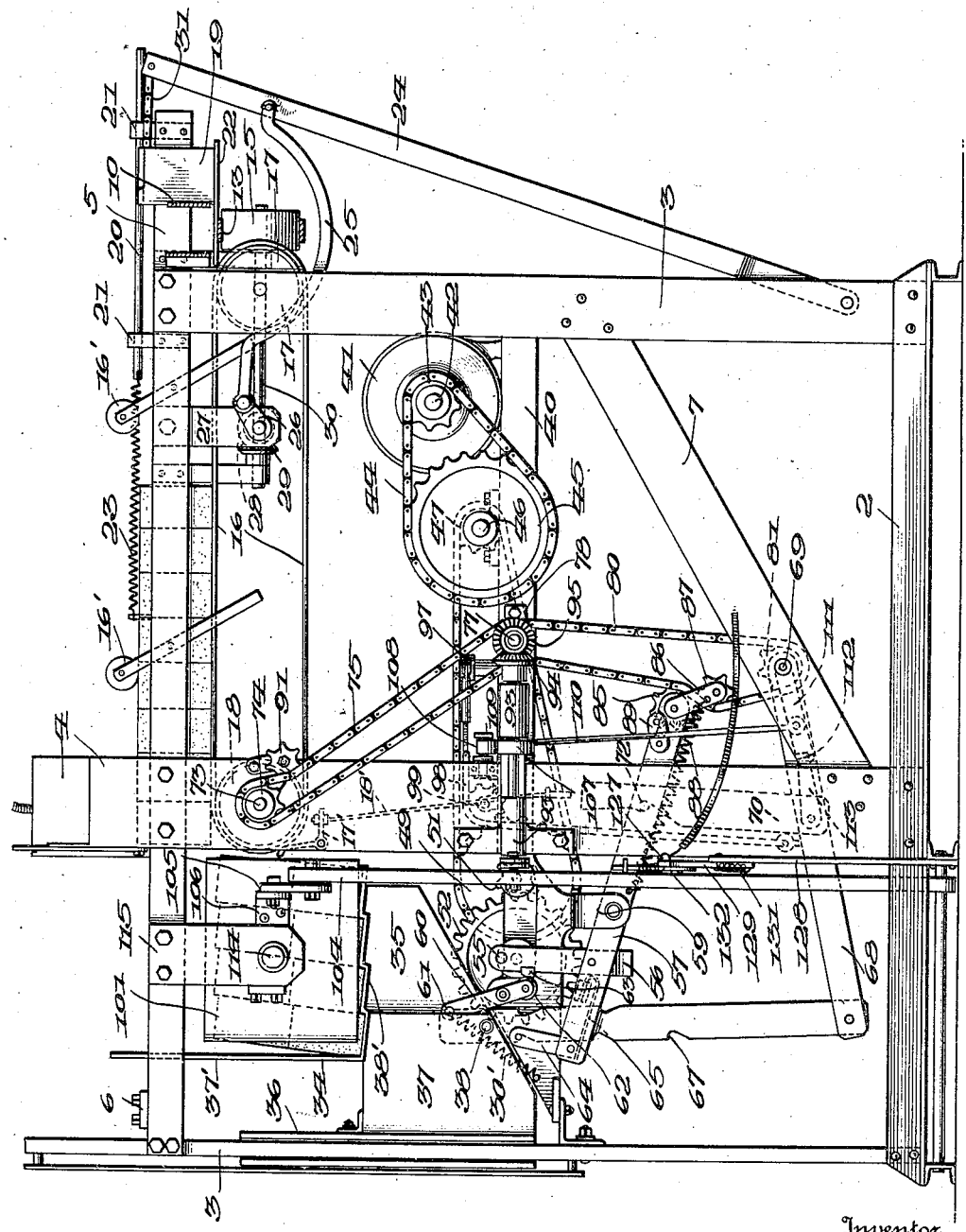
Fig. 3 is a similar elevational view showing the magazine in its lowermost position ready to discharge the assembled packages.

Cooperating with the guide members 10 is a continuously operated feed belt 13, said belt being supported upon pulleys or the like 14 and 15 (see Figs. 5 and 6), and mounted between and beneath the guides 5 and 11 is a second feed belt 16 (see Figs. 1, 3 and 6). The second feed belt 16 is supported upon pulleys and the like 17 and 18 (see Fig. 3). It will be noted that the feed belts 13 and 16 are arranged transversely and substantially at right angles to each other, whereby packages conveyed along the feed belt 13 can be discharged upon the second feed belt 16. Mounted at the junction of these two belts is a horizontally reciprocating member or deflector 19, said deflector being supported and guided in its reciprocating movements upon the upper longitudinal member 5 of the main frame (see Fig. 8). Secured to one side of the deflector 19 is a cylindrical rod or the like 20 adapted to slide or reciprocate in guides 21 secured to the longitudinal member 5 just referred to, whereby the proper guiding support for the deflector 19 will be assured. Secured to the bottom of the deflector 19 is a thin metallic plate 22 adapted to overlie the first mentioned feed belt 13 and also the second feed belt 16 so that the transfer of the packages from belt 13 to belt 16 will be facilitated and the gap between the two belts will be properly bridged. This deflector 19 is adapted to be reciprocated to push the packages from belt 13 onto belt 16 and is intermittently operated in this horizontal reciprocating movement by a combined spring and positive action. Secured to the inner end of the cylindrical rod 20 carried by the deflector 19 is a tension spring 23 which normally tends to draw the deflector inwardly. Counteracting this operation and to intermittently withdraw the deflector outwardly against the tension of the spring is a yoke or the like 24 pivoted at its lower ends to the base of the main frame and connected at its upper end to an arm 25, which arm is in turn pivotally connected to a crank 26, rotatably mounted in the bracket arm 27 extending downwardly from the intermediate longitudinal member 11 of the main frame (see Figs. 1, 2 and 3). This crank 26 is provided with a beveled gear 28 adapted to mesh with a similar gear 29 carried by the inner end of a shaft 30, the outer end of said shaft supporting the pulley 15 of the feed belt 13, whereupon said shaft 30 will be rotated continuously with the moving of the feed belt 13 and correspondingly the beveled gear 29 carried by said shaft 30 meshing with the gear 28 will cause a continuous rotation of the crank 26 carrying the arm 25, which arm in turn is connected to the yoke 24 and causes a continuous reciprocation or oscillation of said yoke at all times during the operation of the feed belt 13. This yoke 24 is connected to the deflector 19 by a chain or similar flexible connection 31, whereby an oscillation of the yoke 24 will cause a reciprocation of the deflector 19, it of course to be understood that the yoke 24 cooperating with the pull of the tension spring 23 produces the complete reciprocation of the deflector 19. It is to be understood that the speed of rotation of the crank 26 is determined by the relative sizes of the gears 28 and 29, and the sizes of these gears are such that the deflector 19 will be reciprocated in timed relation with the moving of the packages into position to be delivered from the first feed belt 13 onto the second feed belt 16, whereby these packages will be transferred or delivered in groups of the proper denomination according to the size of the packages.

The pulley 14 supporting the outer end of the feed belt 13 (see Figs. 5 and 6) is provided with a shaft 31 supporting a drive pulley 32, whereby any source of power may be applied to the pulley 32 by way of a belt or the like 33 to cause a continuous and a constant running of this initial feed belt 13. The power for driving the belt 33 is preferably from an outside source, but it is obvious that by proper gearing and the like this belt 13 can be constantly driven from the electric motor mounted on the main frame for operating the machine as a whole.

The second feed belt 16 is intermittently operated, in a manner to be hereinafter more fully described, and this belt receives the packages from the first feed belt 13 and conveys the same to the vertically reciprocated magazine or platform 34. This platform as shown in Fig. 2 is in position to receive the first or bottom layer of packages to be discharged from the belt 16. This magazine or platform is supported by a main bracket 35, which bracket carries a slide 36 mounted between the two vertical end members 3 (see Figs. 1, 2, 3, 6 and 10). In addition to the main supporting bracket 35 there is a supplemental bracket 37 (see Figs. 3, 6 and 10). The platform or magazine 34 is substantially a right angle plate provided with an upstanding vertical portion 37' and a stepped bottom portion 38', the bottom portion being secured to the brackets 35 and 37. The purpose of stepping the bottom as shown is to prevent the upper layer of packages, as they are fed into the magazine above the bottom layer, from striking any upwardly projecting edges of the packages of the bottom layer. In other words, if the bottom of the platform 34 were merely flat and the first layer of packages fed thereon in a horizontal or level position, there is a danger of having the bottom edges of the top layer hang or stick as they are fed into the magazine on top of the bottom layer. It will be apparent upon referring to Fig. 4 that by reason of the stepped construction of the bottom of the platform 34, the bottom layer of packages will be inclined in such a manner as to present no upwardly protruding edges to the advancing second layer. These packages, when the magazine is filled, are subsequently straightened up and before being delivered to the carton by a mechanism to be hereinafter described.

Associated with the delivery side of the magazine or platform 34 is a neck or extension 39' (see Fig. 6), which neck or extension is for the purpose of having placed thereover or thereon the open side of a carton to be filled, in a position to receive the assembled packages as they are discharged from the magazine or platform.

Extending between the main bracket 35 and the supplemental bracket 37 is a shaft 38 to which is pivotally secured a downwardly extending connecting rod 39, by which the platform 34 is lowered step by step and then raised in a manner to be hereinafter more fully described.

Mounted upon a horizontal platform 40 carried by the main frame is an electric motor or the like 41 for driving the various mechanisms and instrumentalities during the operation of the machine. This motor is provided with a shaft 42 carrying a sprocket 43, supporting a sprocket chain 44, which chain extends around a larger sprocket wheel 45 carried by a shaft 46 rotatably mounted upon the platform 40, all of which is clearly shown in Fig. 1. Referring more particularly to Fig. 4 it will be noted that the opposite end of the shaft 46 is provided with a smaller sprocket 47 supporting a sprocket chain 48 running to and around a larger sprocket wheel 49 secured to a shaft 50 journalled in the main frame of the machine. This shaft 50 carries a gear 51 meshing with a larger gear 52 (see Figs. 2, 10 and 11). The gear 52 carries a shaft 53 rotatably mounted in a stationary bracket 54 and the inner end of the shaft 53 is provided with an eccentric 55 pivotally supporting a short connecting rod 56. Pivotally connected to the lower end of the connecting rod 56 is a lever arm 57 having its main fulcrum and support at 58 in a depending bracket 59 carried by a rigid part of the machine frame (see particularly Figs. 10 and 11).

These various parts just described beginning with the description of the electric motor are all continuously operated during the operation of the machine.

Mounted adjacent the eccentric 55 is a pivoted dog or the like 60, the upper end of said dog being provided with a boss or projection 61 and the lower end of said dog having rotatably mounted therein a roller or the like 62, said roller being positioned to be engaged by a projecting cam member 63 carried by the connecting rod 56 during the rotation of the eccentric 55. Associated with the upper end of the pivoted dog 60 is a tension spring 60' which tends to hold the pin 61 carried by the upper end of the dog 60 in engagement with the connecting rod 39 as shown particularly in Figs. 9 and 10, in the manner and for the purpose to be hereinafter described. The outer end of the lever arm 57 is provided with a pivoted pawl or the like 64, which is normally held at right angles to the lever arm 57 by a flat spring or the like 65. The outer or upper end of the pawl 64 is provided with a projection or boss 66.

The hereinbefore referred to connecting rod 39 supporting the magazine or platform 34 is provided with oppositely disposed and staggered notches or depressions 67, and as clearly shown in Figs. 10 and 11, the projections or bosses 61 and 66 of the pivoted pawls or dogs 60 and 64 are so mounted as to be in proper position to engage these notches 67 during the raising and lowering of the platform or magazine.

Pivotally secured to the lower end of the connecting rod 39 is an arm 68, the inner end of which is pivoted about a stationary shaft 69 transversely mounted between the diagonal members 7 of the main frame (see Figs. 1, 2 and 3). This arm 68 in reality comprises two parallel members as more clearly shown in Fig. 1 between which is pivotally mounted a vertically disposed member 70, said member being provided near its upper end with a notch 71 in position to be engaged at times by a pin 72 carried by the lever arm 57. It might be here noted also that the lever arm 57 comprises two parallel members as more clearly shown in Fig. 1, the vertically disposed member 70 being positioned between the parallel members of the lever arm 57 and the member 68.

As hereinbefore stated, the feed belt 16 is intermittently driven and the movements of said belt are timed with respect to the movements and position of the platform or magazine 34. This magazine 34 is raised and lowered by the mechanism comprising the various levers just described in a manner to be hereinafter more fully set forth in describing the operation of the machine. The means for intermittently feeding the belt 16 therefore is directly associated with the movements of these various levers and connecting rods, to wit 39, 57, 68 etc., and the specific means employed for intermittently feeding the belt 16 will now be described. The pulley 18 supporting the inner end of the belt 16 (see Figs. 3, 5, 13 and 14) is provided with a shaft 73 journalled in the frame work of the machine and the rear end of this shaft is provided with a sprocket 74 for receiving a chain 75, the opposite end of said chain being connected to a sprocket wheel 76 freely mounted on a shaft 77 carried by a bracket 78 (see Fig. 15). The inner end of this shaft 77 is provided with a sprocket 79 adapted to receive a downwardly extending chain 80 and the lower end of the chain 80 is supported about a sprocket 81 mounted on the stationary shaft 69 (see Figs. 2, 3 and 11). The outer end of the shaft 77 (Fig. 15) is provided with a key 82 which is normally held in engagement with a key slot 83 formed in the sprocket 76, by a spring or the like 84 properly mounted and secured to the inner end of said shaft 77. It will be seen from the above description that any movement of the chain 80 will rotate sprocket 79 and correspondingly shaft 77, and when the sprocket 76 is keyed to the shaft 77, which is its normal position, this sprocket also will be rotated and correspondingly through its chain 75 and sprocket 74, shaft 73 carrying the belt supporting pulley 18 of belt 16 will also be rotated.

With this understanding of this drive construction it will be noted that any movement of the chain 80 (see Fig. 3) will cause a rotation of the shaft 73 and the pulley 18 and correspondingly a movement of the belt 16. As hereinbefore stated, it is only desirable to cause this movement intermittently, and this intermittent movement is produced by the following means. Carried by the inner end of the lever arm 57 is a sprocket 85, and the length of this arm and the position of the sprocket is such that as the arm is raised and lowered during the operation of the machine, the sprocket 85 will be in engagement with the chain 80. In order to maintain this engagement, there is pivotally connected to the arm 57 adjacent the sprocket 85 a link 86 carrying a smaller sprocket 87, and this sprocket is held against the inner face of the chain 80 by a tension spring 88, all of which being clearly shown particularly in Figs. 3, 11 and 12. Also carried by the inner end of the lever arm 57 is a pawl or the like 89 in position to engage the teeth of the sprocket 85, a tension spring 90 being provided to normally hold the pawl in engagement with the teeth of said sprocket 85. This pawl is so positioned with respect to the sprocket teeth as to permit a clockwise rotation of the sprocket 85 but prevent a counter clockwise movement of said sprocket, so that as the inner end of the lever 57 rides up the chain 80 there will be no movement of the chain, the sprockets 85 and 87 merely rotating and meshing with the chain links, but upon the return or downward movement of the lever 57, the sprocket 85 will be locked against rotation by its pawl 89 and therefore locked to the chain 80 so that any downward movement of the lever arm 57 will exert a downward pull on the chain 80 and a corresponding movement of chain 75 and a rotation of the shaft 73 carrying the pulley for supporting the inner end of the belt 16, so that upon each downward movement of the inner end of the lever arm 57, a limited rotation will be imparted to the belt pulley 18 and correspondingly a limited or intermittent movement of the belt 16. In order to take up any unnecessary slack in the chain 75 an adjustable idler sprocket 91 is provided as shown more clearly in Figs. 1, 2, 3 and 10. This lever arm 57 is associated in the manner to be hereinafter described with the raising and lowering of the magazine or platform 34. These various movements just described are timed and so co-related as to cause a movement of the feed belt 16 only at such times as the platform or magazine is in a position to receive the packages delivered from the belt 16.

Mounted at the delivery end of the belt 16 is a lever device 17' having a downwardly extending rod 18' to be engaged by the inner end of the lever arm 57 during the upward movement of said inner end whereby the crank 17' will force the packages into the stepped portions of the bottom of the magazine 34 to incline the packages so that the packages present inclines with no obstructions to the next row of oncoming packages.

Associated with the shaft 77 (see particularly Figs. 13 and 14), is a supplemental shaft 92 arranged at right angles to said shaft 77 and rotatably journaled in bearings 93 forming a part of the aforementioned bracket 78. This shaft 92 at one end is provided with a beveled gear 94 in mesh at all times with a gear 95 carried on the adjacent end of the shaft 77 and normally this gear 95 is freely rotatable on said shaft 77. The gear 94 however is keyed to its shaft 92. As hereinbefore described (see Fig. 15) the shaft 77 is provided with a key 82 normally held in engagement with a key way 83 formed in the hub of sprocket 76 by a compression spring 84. The normally freely rotatable beveled gear 95 is also provided with a key way 96 so that upon the outward movement of the shaft 77 against the tension of spring 84 the key 82 will be forced into the key way 96 so that upon the rotation of the shaft 77 beveled gear 95 will be rotated and simultaneously therewith gear 94 and its shaft 92. The shaft 77 is periodically projected outwardly by a bell crank lever 97 connected to a chain or the like 98 running over a sprocket 99 and extending downwardly to the arm 68 of the platform or magazine reciprocating mechanism, the attachment being accomplished by an eye bolt or the like 100. The object of the shaft 92 (Figs. 13 and 14) is for the purpose of intermittently reciprocating a pusher plate or ejector 101 (see Figs. 1, 3 and 9). This shaft 92 in addition to being provided at one end with the beveled gear 94 has secured to it at its opposite end a crank arm 102 to which is secured a pivoted extension 103, said extension being in turn pivotally connected to a lever 104, said lever at its lower end being pivotally anchored to the frame and having its upper end pivotally connected to a link 105, which link is in turn connected to the pusher plate or ejector 101 at 106, all of which being clearly shown in Figs. 1, 2, 5 and 9. As hereinbefore stated, the shaft 92 for operating the various cranks and levers associated with the pusher plate or ejector 101 is only intermittently operated, and only operated at such times as it is desired to discharge the full contents of the platform or magazine. This operation only takes place when the platform or magazine is in its extreme lowermost position and likewise when the connecting rod 39 and the arm 68 are in their lowermost position, so that by reason of the fact that the chain 98 is connected to the arm 68 when said arm is in its lowermost position, chain 98 will be pulled downwardly, and the bell crank 97 connected to said chain (see Fig. 13) will be rotated on its pivot and in so doing force shaft 77 outwardly and cause the key 82 to engage the key slot 96 in the beveled gear 95 and thereby cause a rotation of gear 95 and its intermeshing gear 94 and correspondingly a rotation of shaft 92. Upon the following upward movement of the arm 68 (see Fig. 11) chain 98 will be slack and spring 84 will withdraw shaft 77 and its key 82 and thereby discontinue the rotation of shaft 92 so that it will be clearly seen that shaft 92 employed for the purpose of causing the operation of the pusher plate will only be intermittently operated and operated only when the platform or magazine is in its lowermost position and ready to have its contents discharged by the pusher plate or ejector. Also secured to the shaft 92 is a heart shaped cam 107 adapted to cooperate with a roller 108 carried by the outer end of an intermediately pivoted lever 109, the inner end of said lever being connected to a downwardly extending rod 110, and the lower end of this rod is adapted to control a pivoted arm or latch 111 mounted on the shaft 69 adjacent the inner end of the arm 68 of the magazine raising and lowering mechanism. This latch 111 is provided with a notch 112 adapted to support at times an arm 113 rigidly connected to the vertical member 70 of the magazine raising and lowering mechanism, so that upon the intermittent rotation of the shaft 92 in the manner as hereinbefore described, the cam 107 will be likewise rotated, causing a lifting of the outer end of the lever 109 and the corresponding lowering of the rod 110 and the latch 111 associated therewith and connected to the lower end thereof. The lowering of the latch 111 is for the purpose of permitting the vertical member 70 to fall away from the pin 72 of the lever arm 57 (see Fig. 2), at certain times during the operation of the mechanism to be hereinafter more fully described. At the same time when the roller 108 is in the recessed portion of the cam 107 while shaft 92 is stationary, the vertical arm 70 will be held against the pin 72 by the engagement of the latch 111 with the arm 113, which arm 113 in reality forms a bell crank lever construction in combination with the vertical member 70, said parts being rigidly keyed together.

The pusher plate or ejector 101 is carried by a reciprocating rod 114, said rod being supported in two downwardly extending members 115 rigidly secured to the main frame as clearly shown in Figs. 1 and 9, this reciprocating rod 114 provides a positive and accurate means for positioning and guiding the ejector during its reciprocating movements, and it is to be understood that this rod 114 acts merely as a support and guide, as the various levers and arms for reciprocating the pusher plate or ejector are connected directly to said pusher plate as clearly shown in Figs. 1 and 9.

In order to maintain the packages in uniform contact with the intermittently operated feed belt 16, there are provided pressure rollers 16' engaging the tops of the packages. These rollers are journalled in pivoted arms supported by the main frame of the machine whereby they will accommodate packages of various heights within certain limits.

As hereinbefore stated, the present machine is driven by an electric motor and means are provided for automatically starting and stopping the machine, and attention is called particularly to Figs. 6, 7, and 16 to 19 inclusive, with particular reference to Figs. 6, 18 and 19. It will be noted that positioned immediately below the upper reach of the first feed belt 13 and at the outer end of the belt is a spring plate 116, said plate being secured to the guide member 10 of said feed belt by a bracket or stirrup 117, and at all times this spring plate 116 is in contact with the feed belt 13. Also secured to the guide members 10 near the outer end of the spring plate 116 is a yoke or bracket 118 having pivotally secured thereto a rod 119. Upon the inner end of this rod is mounted a mercury tube switch 120 and said rod and switch are maintained in contact normally with the spring plate 116 by a pivot pin 121, said parts being held in engagement by a weight 122 adjustably mounted on the opposite end of the rod 119. Mounted adjacent the weighted end of the rod 119 is a stepped latch or the like 123 being pivoted at its lower end to the frame of the machine as at 124, said latch 123 being normally urged in the direction of the arm 119 by a tension spring 125. Also associated with the latch 123 is an electromagnet or solenoid 126, and this solenoid is in circuit with the main source of current through a mercury tube switch 127, which latter switch is carried by a stationary bracket 128 connected to the main frame of the machine in position to be engaged by the pivoted arm 104 of the ejector mechanism. More specifically this mercury tube switch is supported upon a plate 129 pivotally mounted at 130 to the bracket 128. This plate 129 is normally held in an inclined position by a spring 131 with the circuit broken. The upper portion of the plate 129 is provided with a pivoted arm 132 adapted to be engaged by a pin 133 carried by the pivoted arm 104 of the ejector mechanism. With this construction each time the ejector mechanism is operated and the same moves forwardly the pin 133 of said arm 104 will engage pivoted arm 132 of the switch device and cause a rocking of the plate 129 carrying the mercury tube switch, so that said mercury tube switch will be in horizontal position and the circuit will be closed. Upon the closing of this circuit the solenoid 126 is energized and the stepped latch 123 will be pulled to the left (Fig. 18) and the stepped portion of the latch will be pulled from beneath the weighted end of the pivoted rod 119, permitting said end to drop and tilt the mercury tube switch 120, breaking the main circuit to the motor and stopping the machine. If, however, packages are being supplied to the machine along the first feed belt 13, the weight of these packages upon the belt will depress the free end of the spring plate 116 and hold the switch end of the rod 119 down in a horizontal position so that the circuit will be maintained to the motor 41 and the machine will continue to operate irrespective of the closing of the switch 127. The switch 127 is only for the purpose of automatically stopping the machine when no more packages are being supplied to said machine.

*Operation*

The present machine has been designed to accommodate packages of a certain size and shape, but it is of course to be understood that by merely increasing the size of the feed belts and the distance between the guide ways associated therewith the mechanism as a whole will be adapted to packages of various sizes, and insofar as the invention is concerned, said machine is not restricted in any way to any particular size or shape of package.

In the machine as shown the packages are fed either automatically or by hand onto the continuously moving belt 13 (see Figs. 1, 5 and 6). This belt 13 is preferably driven by any outside source independently of the motor 41, but it is of course to be understood that by proper arrangements of clutches or the like this belt could be continuously driven by the motor 41 without in any way interfering with the remaining mechanism of the machine. As the packages accumulate on the feed belt 13, and by the time said belt is approximately fully loaded, the weight of these packages will depress the flexible plate 116 associated therewith and in so doing will depress the inner end of the lever or rod 119 carrying the mercury tube switch 120, forcing said mercury tube switch downwardly to a horizontal position and thereby closing the circuit to the motor in a well known manner common to the operation of this type of switch, and it is thought unnecessary to go into any details in regard to this circuit closing operation. Upon the closing of the circuit the motor 41 will be started and the machine put into operation. As the packages arrive at the junction of the belt 13 and the belt 16, they are pushed or moved from belt 13 onto the belt 16 by the reciprocating pusher or deflector 19, this deflector 19 being continuously reciprocated by the gears 28, 29, crank 26, and connecting rod 25, as hereinbefore described, and as clearly shown in Fig. 4. The packages while on the belt 16 are intermittently moved along said belt step by step towards the delivery end of the belt in a position to be discharged into the platform or magazine 34. This magazine is raised from its lowermost position to its receiving position as shown in Fig. 2, in one movement, but is lowered from the position shown in Fig. 2, to a halfway position and then to its extreme lowermost position in two movements, so that the packages are deposited on the platform 34 in two layers of preferably twelve packages to a layer as shown in Fig. 4. The movements of this platform or magazine are timed with respect to the intermittent movements of the belt 16 so that as the platform 34 arrives at its extreme upper position as shown in Fig. 2, it will remain in this position while the belt 16 is moved sufficiently far to discharge the first layer of packages onto the magazine or platform, whereupon the belt 16 will be automatically stopped and the platform automatically lowered to its intermediate position and again stopped, whereupon the belt 16 will again be moved to discharge or deposit the second layer of packages on top of the first layer of packages then in the magazine. At the end of this operation the belt 16 will again be automatically stopped, and the horizontally movable ejector or pusher plate moving transversely of the platform 34 will be brought into operation and all of the packages then in the magazine will be pushed or forced off of the platform or magazine into a carton positioned with respect to the magazine to receive the entire contents of the magazine.

To accomplish and perform these functions the motor 41 which is continuously driven transmits its power by way of sprocket 43, chain 44, sprocket 45, sprocket 47 and chain 48 to sprocket 49 (see Figs. 1, 2 and 4). The shaft 50 carrying sprocket 49 is provided with a spur gear 51 which is in mesh with a larger spur gear 52 (see Fig. 11). The shaft 53 of the spur gear 52 carries an eccentric 55 supporting a downwardly projecting connecting rod 56, so that with the aforesaid train of gearing the continuous running of the motor 41 will cause a continuous rotation of the eccentric 55 carrying the connecting rod 56. This connecting rod being provided with a cam block or the like 63 is in position to engage the lower end of the pivoted dog 60, and when said cam block 63 is not in engagement with the lower end of said dog 60, this dog by reason of its spring 60' will be held in engagement with one of the notches 67 of the connecting rod 39 supporting the platform or magazine. In the position as shown in Fig. 11, the pivoted dog 60 is in engagement with the uppermost notch 67 of the connecting rod 39 of the magazine and the magazine is in its lowermost position ready to be discharged. In Fig. 2 the pivoted dog 60 is in engagement with its lowermost notch 67, whereby the platform or magazine is held in its uppermost or receiving position. With particular reference to Fig. 2, as the eccentric 55 is rotated the cam block 63 when in its extreme left position will engage the lower end of the dog 60 and cause the same to be released from the connecting rod 39 and permit the platform 34 to be lowered to its second position, where its intermediate notch is again engaged by the dog 60, retaining the magazine in this position, where it is to receive the second layer of packages.

In order, however, to provide for a gradual lowering of this magazine, the lower end of the connecting rod 56 is pivotally connected to a lever arm 57, and when the cam block 63 is in position to trip the pivoted dog 60 and release the same from the connecting rod 39, the lever arm 57 is in its raised position and its pivoted pawl is in engagement with its uppermost notch 67. A continued movement of the eccentric 55 to the right or clockwise (see Fig. 11) will press against the lower end of the pivoted dog 60, release the upper end of said dog from its notch 67, and the connecting rod 39 and its magazine 34 will then be supported by the lever 57. A further rotation of the eccentric 55 to the right or in a clockwise direction will lower its connecting rod 56 and correspondingly the outer end of the lever arm 57 carrying with it the connecting rod 39 and its magazine 34. By the time the eccentric 55 is in its lowermost position at this point of the cycle, the magazine 34 and connecting rod 39 have arrived at the intermediate position, whereby the second layer of packages are delivered onto the platform. As the lever arm 57 moves upwardly at the beginning of the cycle to engage its lowermost notch 67 (see Fig. 2), the inner end of said lever 57 by the mechanism hereinbefore described exerts a downward pull on the chain 80, which in turn operates chain 75 and causes a limited rotation of the drive pulley 18 of the belt 16 to cause an intermittent movement of the belt and a feeding of one layer of packages onto the waiting magazine 34. While the pivoted pawl 64 at the outer end of the lever arm 57 is being lowered to engage its lowermost notch 67 of the connecting rod 39, the inner end of said lever arm 57 is merely riding up the chain 80 without moving said chain so as to be in a position to again move said chain during the next downward movement of the inner end of the lever arm 57, so that no movement is imparted to the belt 16 as the outer end of the lever arm 57 is lowered to engage the connecting rod 39. After the pawl 64 on the outer end of the lever arm 57 is in engagement with its lowermost notch 67, a continued rotation of the eccentric 55 by reason of the cam block 63 on the connecting rod 56 will trip the dog 60 and release the same from its notch 67 of the connecting rod 39, so that said connecting rod will then be supported by the pawl 64 on the outer end of the lever arm 57. A further rotation of the eccentric 55 by reason of its connection through connecting rod 56 with the lever arm 57 will cause a downward movement of the outer end of the lever arm 57 and along with it the downward movement of the platform or magazine 34, and said magazine will then be in its intermediate position. As soon as it arrives at this position, the pivoted dog 60 will then engage its intermediate notch 67 and support the magazine in this position while the outer end of the lever arm 57 is again lowered and disengaged from the connecting rod 39. During the lowering of the outer end of the lever arm 57 the inner end then being locked to the chain 80 will cause an upward pull on said chain and correspondingly a movement of chain 75, and the belt 16 will again be moved a predetermined distance sufficient to discharge a second layer of packages onto the waiting platform 34. A further continuous rotation of the eccentric 55 will thereafter raise the outer end of the lever arm 57 so that its pawl 64 will be in a position to engage its uppermost notch 67 of the connecting rod 39 and immediately thereafter the cam block 63 will engage the lower end of the pivoted dog 60 and release said dog from its intermediate notch so that the connecting rod 39 and its magazine will again be supported by the outer end of the lever arm 57, so that a further rotation of the eccentric 55 will again lower this arm and with it the magazine 34 and connecting rod 39 to its lowermost position, whereupon the dog 60 will be snapped into its uppermost notch 67 and the magazine will be in a position to be discharged. This cycle is repeated step by step as long as the machine is in operation.

The operation just described has to do with the step by step lowering of the magazine, whereas the raising of the magazine is accomplished in one movement and by substantially the same mechanism. During the step by step lowering of the magazine, the fulcrum points are about the shaft 69 of the connecting arm 68 and the pivot 58 of the lever arm 57, which points are so placed as to give the proper leverage or throw to lower the connecting rod 39 a predetermined distance to accomplish this step by step downward movement. In order to raise the platform or magazine 34 by one movement by substantially the same mechanism it is therefore necessary to cause in effect, a shifting of these fulcrums. To produce this movement the vertical member 70 is provided and normally said member 70 is so balanced as to be inclined to the right as shown in Fig. 2 during the step by step lowering of the magazine or platform. As said magazine or platform arrives at its extreme lower position as shown in Fig. 11, the arm 68 is inclined downwardly and the member 70 falls to the left in position to have its notch 71 engage the pin 72 of the lever arm 57, so that upon the next downward movement of the outer end of the lever arm 57 following its position as shown in Fig. 11 the leverage will be between the pivot points 58 and the pivot points 72 and the point of connection of the lower end of the member 70 with the arm 68, whereby a more rapid and extended upper movement will be imparted to the connecting rod 39 sufficient to raise the magazine and its connecting rod to its full uppermost position. At the time the vertical member 70 is in engagement with the pin 72 the latch 111 is caused to engage the arm 113 rigidly connected to said vertical member 70 to hold said parts in this relation. As hereinbefore described, latch 111 is connected to rod 110, the upper end of which being secured to a lever 109, and the free end of this lever being in position to engage the heart shaped cam 107, so that as the shaft 92 is intermittently rotated, (see Fig. 13), in the manner as hereinbefore decribed, this lever 109 will be oscillated at the proper time to raise and lower the rod 110 and its latch 111. This shaft 92 and its cam 107 is so timed with respect to the magazine or platform raising and lowering mechanism as to permit when necessary the vertical member 70 to become disengaged from the pin 72 and when desired to be held in engagement with the pin 72.

The shaft 92 by way of the connecting rods 102 and 103 and pivoted arm 104 is also timed so as to cause a horizontal reciprocation of the pusher plate or ejector 101 when the magazine or platform 34 is in its lowermost and discharging position. This shaft 92, as previously described, by reason of the intermeshing gears 94 and 95 (see Figs. 13, 14 and 15), sliding key 82, shaft 77, bell crank 97 and chain 98 connected to the pivoted member 68 is intermittently rotated each time the connecting rod 39 and the member 68 arrive at their lowermost position as shown in Fig. 11, at which time it is necessary to operate the ejector mechanism and at the same time maintain the member 70 in interlocking engagement with the pin 72 of the lever arm 57 by way of the latch 111, which as previously stated, is also, in addition to the pusher mechanism, operated and controlled by the rotation of the shaft 92.

From the foregoing description it will be apparent that as long as the packages are fed to the first feed belt 13, they will be carried to the machine, transferred preferably in groups of three, by the deflector 19, from said belt 13 to the intermittently operated belt 16, and from the belt 16 they will be discharged preferably in groups of twelve to the waiting magazine or platform in preferably two layers and thereafter the entire contents of the platform or magazine will be discharged into a carton positioned adjacent the discharge end of the magazine, the intermittent movement of the belt 16 and the feeding of the groups of packages from said belt to the magazine being timed with respect to the movements and various positions of said magazine. In the event that no more packages are fed to the belt 13 and said belt is relieved of the weight of said packages, the spring plate 116 carrying the mercury tube switch 120, (see Figs. 18 and 19), will resume its normal and horizontal positions, and at the same time permitting the mercury tube switch 120 by reason of its weight 122 to be tilted sufficiently to break the main circuit to the motor and stop the machine. It is only necessary to resume the feeding of packages to the belt 13 to again start the machine.

It is of course to be understood that certain minor or incidental changes can be made with respect to various parts of the machine, but the present invention is not to be restricted except insofar as the same is defined in the appended claims.

What is claimed is:

1. In a machine for assembling and filling packages into a carton or the like, the combination with a receiving magazine and a feeding means, of means for assembling said packages in said magazine, means for discharging simultaneously all of said assembled packages from the magazine into said carton, and means associated with the feeding means controlled by the weight of the packages for automatically starting and stopping said machine.

2. In a machine for assembling and filling packages into a carton or the like, the combination with a receiving magazine and a feeding means, of means for assembling said packages in said magazine, means for positioning a carton adjacent said magazine, means for discharging simultaneously all of said assembled packages from the magazine into said carton and means associated with the feeding means controlled by the weight of the packages for automatically starting and stopping said machine.

3. In a machine for assembling and filling packages into a carton or the like, the combination with a receiving magazine and a feeding means, of means for assembling said packages in said magazine in a predetermined order, means for discharging simultaneously all of said assembled packages from the magazine into said carton and means associated with the feeding means controlled by the weight of the packages for automatically starting and stopping said machine.

4. In a machine for assembling and filling packages into a carton or the like, the combination with a receiving magazine and a feeding means, of means for assembling said packages in said magazine in superimposed layers, means for discharging simultaneously all of said assembled packages from the magazine into said carton and means associated with the feeding means controlled by the weight of the packages for automatically starting and stopping said machine.

5. In a machine for assembling and filling packages into a carton or the like, the combination with a receiving magazine and a feeding means, of means for assembling said packages in said magazine in superimposed layers of a predetermined number of packages to each layer, means for discharging simultaneously all of said assembled packages from the magazine into said carton and means associated with the feeding means controlled by the weight of the packages for automatically starting and stopping said machine.

6. In a machine for assembling and filling packages into a carton or the like, the combination with a receiving magazine and a feeding means, of means for assembling said packages in said magazine in stepped relation one to the other, means for discharging simultaneously all of said assembled packages from the magazine into said carton and means associated with the feeding means controlled by the weight of the packages for automatically starting and stopping said machine.

7. In a machine for assembling and filling packages into a carton or the like, the combination with a receiving magazine and a feeding means, of means for assembling said packages in said magazine in superimposed layers, the packages in each layer being in stepped relation one to the other, means for discharging simultaneously all of said assembled packages from the magazine into said carton and means associated with the feeding means controlled by the weight of the packages for automatically starting and stopping said machine.

8. In a machine for assembling and filling packages into a carton or the like, the combination with a receiving magazine and a feeding means, of intermittently operated means for assembling said packages in said magazine, means for discharging simultaneously all of said assembled packages from the magazine into said carton and means associated with the feeding means controlled by the weight of the packages for automatically starting and stopping said machine.

9. In a machine for assembling and filling packages into a carton or the like, the combination with a receiving magazine and a feeding means, of intermittently operated means for assembling said packages in said magazine, means for positioning a carton adjacent said magazine, means for discharging simultaneously all of said assembled packages from the magazine into said carton and means associated with the feeding means controlled by the weight of the packages for automatically starting and stopping said machine.

10. In a machine for assembling and filling packages into a carton or the like, the combination with a receiving magazine and a feeding means, of means for assembling said packages in said magazine, means for discharging simultaneously all of said assembled packages from the magazine into said carton, a master switch associated with the feeding means and controlled by the weight of the packages for automatically starting and stopping said machine and a secondary switch, controlled by the discharging means for effecting a stopping of the machine when no more packages are being fed to the machine.

11. In a machine for assembling and filling packages into a carton or the like, the combination with a receiving magazine and a feeding means, of means for assembling said packages in said magazine, means for discharging simultaneously all of said assembled packages from the magazine into said carton, a master switch associated with the feeding means and controlled by the weight of the packages for starting and stopping said machine and a secondary switch, controlled by the discharging means for effecting a stopping of the machine when no more packages are being fed to the machine.

12. In a machine for assembling and filling packages into a carton or the like, the combination with a receiving magazine, of means for assembling said packages in said magazine, means for discharging simultaneously all of said assembled packages from the magazine into said carton, and means controlled by the weight of the packages delivered to the machine for starting and stopping said machine, and additional means controlled by the discharging of the magazine for effecting a stopping of the machine when no more packages are being fed to the machine.

13. In a machine for assembling and filling packages into a carton or the like, the combination with a continuously operated feed belt, of an intermittently operated feed belt and a receiving and ejecting magazine, means for transferring packages from the first mentioned belt to the second mentioned belt, means for feeding said packages from the second belt and assembling them in said magazine, an ejector associated with the magazine for discharging the assembled packages into said carton and corelated electrical switch devices associated with the feeding means and the discharging means for automatically starting and stopping said machine.

14. In a machine for assembling and filling packages into a carton or the like, the combination with a continuously operated feed belt, of an intermittently operated feed belt and a receiving and ejecting magazine, means for transferring packages in groups from the first belt to the second belt, means for intermittently feeding said packages from the second belt and assembling them in superimposed layers in said magazine, an enjector associated with the magazine for discharging simultaneously the various layers of packages into said carton and corelated electrical switch devices associated with the feeding means and the discharging means for automatically starting and stopping said machine.

15. In a machine for assembling and filling packages into a carton or the like, the combination with a continuously operated feed belt, of an intermittently operated feed belt arranged at right angles to one end of said first mentioned belt, a vertically reciprocating receiving and ejecting magazine mounted adjacent the other end of said intermittently operated belt, positively operated means for intermittently moving the packages from the first belt onto the second belt, means for intermittently discharging the packages from the second belt into said magazine, means for reciprocating said magazine to successively position the same to receive the packages from the second belt in a series of layers of a predetermined number of packages to each layer, an ejector mechanism for said magazine, power operated means common to all of said mechanisms for operating the same in properly timed relation and corelated electrical switch devices associated with the feeding means and the discharging means for automatically starting and stopping said machine.

CHARLES H. WILD.